June 23, 1959 D. M. CHAUVIN ET AL 2,892,080
LIMITER FOR RADIO CIRCUITS
Filed Nov. 10, 1953
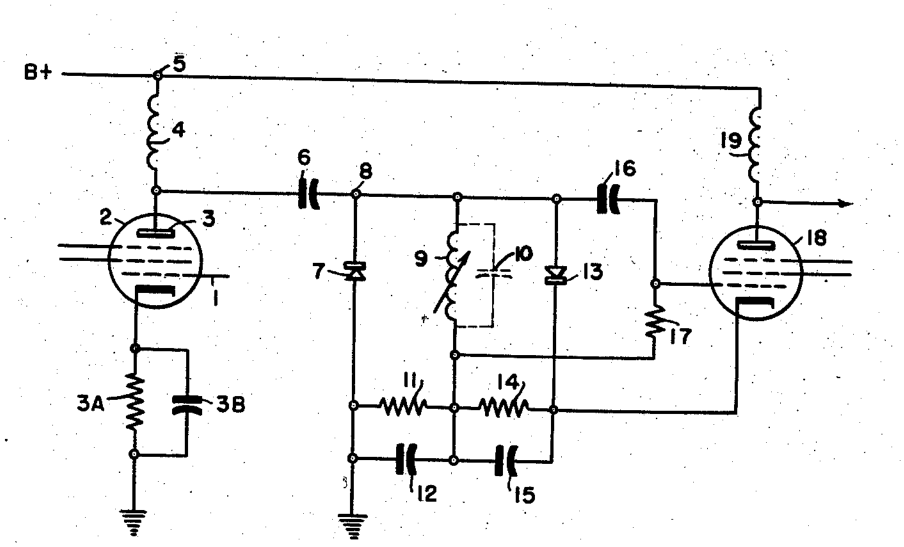
WITNESSES:
E. A. McCloskey.
Leon J. Laza
INVENTORS
David M. Chauvin and
Martin T. Mueller.
BY
F. E. Browder
ATTORNEY 2,892,080

LIMITER FOR RADIO CIRCUITS

David M. Chauvin, Glen Burnie, and Martin T. Mueller, Baltimore, Md., assignors to Westinghouse Electric Corporation, East Pittsburgh, Pa., a corporation of Pennsylvania Application November 10, 1953, Serial No. 391,339

5 Claims. (Cl. 250—27)

Our invention relates to electronic current amplifiers and in particular relates to current limiters for electronic circuits. One case in which we have found it to be of particular utility is that of a receiver for FM signals of 30 megacycle frequency employed in a point-to-point communication system.

As is well known, FM receivers commonly employ ahead of the discriminator ending their intermediate frequency stage a limiter which removes any variations in amplitude which may be present in the incoming signals. Typical limiters of the prior art are one or two serially-connected sharp cutoff pentodes which are operated with such electrode voltages that the plate current is "saturated" and nearly independent of input signal strength. However, we have found that a circuit embodying two pentodes connected in cascade through a network involving an inductor, a pair of resistor-shunted capacitors and a pair of oppositely-poled rectifiers will give much nearer constancy of output-voltage over a wide range of input-voltage than is attainable with such prior-art limiters.

One object of our invention is accordingly to produce a novel and improved limiter for radio and similar circuits.

Another object is to provide a network having input and output terminals in which the voltage at the output terminals is maintained nearly constant over a wide percentage range of input voltage.

Other objects of our invention will become apparent upon reading the following description taken in connection with the drawing in which the single figure is a schematic diagram of a circuit embodying our invention.

Referring to the drawing in detail, the voltage which is to be amplitude-limited, such as the intermediate-frequency signal of an FM radio receiver, is impressed between ground and the control grid 1 of a sharp-cutoff pentode 2 having its anode 3 connected through an inductor 4 to the positive terminal 5 of a direct current source (not shown), the negative pole of which is grounded. The cathode of pentode 2 is grounded through a cathode resistor 3A and filter capacitor 3B. The anode 3 of pentode 2 is connected to ground through a blocking capacitor 6 and a rectifier 7, which may be a germanium diode which is poled to conduct electrons from capacitor 6 to ground. The common junction 8 of capacitor 6 and rectifier 7 is connected to ground through a variable inductor 9 and cathode-bias resistor 11, the latter being shunted by a filter capacitor 12. The inductor 9 is shunted by a rectifier 13 in series with a cathode-bias resistor 14 connected in parallel with a filter capacitor 15, rectifier 13 being poled to conduct electrons from ground toward junction 8. Inductor 9 is likewise shunted by a capacitor 16 in series with a grid resistor 17. A second sharp cutoff pentode 18 has its anode connected through an inductor 19 to positive terminal 5, and has its cathode connected to the common junction of rectifier 13 with resistor 14. The control grid of pentode 18 is connected to the common junction of capacitor 16 and grid resistor 17; and the output circuit from the limiter to a discriminator (not shown) is connected between ground and the anode of tube 18.

In the above-described circuit the rectifiers 7 and 13 are biased by the voltage-drop of the plate current of pentode 18 flowing through cathode resistors 11 and 14, these resistors being equal. Inductor 9 and its distributed capacity 10 (indicated by dotted lines) form an anti-resonant circuit which is tuned to the FM center frequency of the signal applied to pentode 2. When the signal applied to grid 1 on pentode 2 is small, the voltage peaks across inductor 9 are too small to overcome the bias on either rectifier 7 or 13 and neither conducts. At such low signal levels, capacitor 16 and resistor 17 act as a coupling impressing on pentode 18 the oscillations of inductor 9 which is tuned with its distributed capacity to the center-frequency of the FM signal.

As the level of the input signal at 1 increases a point is reached at which the positive and negative peak values of the voltage across inductor 9 exceeds the D.C. bias on the respective rectifiers 7 and 13 and the latter begin to clip the tops off both halves of the signal waves. This clipping action is effective because the waves applied to the diodes emanate from a high impedance, virtually constant current, source comprising the pentode 2.

As the signal level increases still further the rectifiers 7 and 13 clip off a larger and larger fraction of the signal wave, and the average values of the currents through these rectifiers increase. This acts as a greater and greater energy dissipation-load on the resonating circuit comprising inductor 9 and its distributed capacitance and in effect lowers the Q and greatly widens the bandwidth of the circuit.

The currents through rectifiers 7 and 13 are equal and flow through the cathode resistors 11 and 14 in the same direction as the cathode current of pentode 18 thereby increasing the voltage drop across these resistors. Since resistor 17 is connected to the negative end of resistor 14, the transconductance Gm of pentode 18 is lowered due to the increase of bias on pentode 18 while at the same time the increased voltage drop through resistors 11 and 14 raises the cathode potential of pentode 18 relative to ground and in effect lowers the direct current plate voltage of that tube. However, this latter effect is considerably smaller than that due to resistor 17. The change in cathode potential has a decreasing effect on the plate current of pentode 18 but cannot quite compensate for the biasing effect due to the current from rectifiers 7 and 13, so as the signal level increases there is a net increase of negative bias decreasing the Gm of the pentode. As the FM signal is increased, the bias of rectifiers 7 and 13 increases due to the greater amplitude of this signal, and if the Gm of pentode 18 were not decreased as explained, a gradual upward slope of the output voltage would result with increased input. However, by decreasing the Gm as a function of the increased bias from rectifiers 7 and 13, the output voltage between ground and the anode of pentode 18 is relatively constant at all signal strengths above that at which rectifiers 7 and 13 begin to pass current.

The cascading of two or more stages of the type shown in the figure makes the output voltage even more invariable.

The signal strength at which the limiting effect begins can be varied at will by changing the values of resistors 11 and 14.

While we have illustrated the principles of our invention by describing a single embodiment, those principles are of broader application in ways which will be evident to those skilled in the radio art. We therefore intend the terms of our claims to be given the broadest reasonable interpretation of which they are capable in view of the prior art.

We claim as our invention:

1. An amplitude limiter for radio circuits comprising an input amplifying device having a cathode connected to ground, an output circuit for said input device containing an antiresonant circuit in series with a first resistor, a first rectifier shunting the inductance of said antiresonant circuit and said first resistor, an output amplifying pentode device having at least an anode, cathode and control electrode, a second resistor in series with said first resistor, the series combination of said first and second resistors connecting the cathode of said output pentode device to ground, a second rectifier connected serially with said second resistor to form a shunt around said inductance, a capacitor-resistor coupling shunting said inductance and having the junction of its capacitor and resistor connected to the control electrode of said output device, means to cause said direct current to flow through said output pentode device and both of said first and second resistors in series, and a load circuit connecting the anode of said output pentode device to ground.

2. An amplitude limiter for radio circuits comprising a first amplifying device of a type in which output current varies as a function of the voltage of an applied input signal, an output circuit for said device containing an antiresonant circuit in series with a first resistor which is capacitor bypassed, a first rectifier shunting the inductance of said antiresonant circuit and said first resistor, a second amplifying device of a pentode type in which output current varies as a function of the voltage of an applied input signal, said second device having at least a cathode and a control electrode, a second resistor which is capacitor bypassed connecting said cathode to the common junction of said antiresonant circuit and said first resistor, a second rectifier connected in shunt with said antiresonant circuit and said second resistor, means for connecting said common junction directly to the control electrode of said second device, and means to cause current through said second device to flow in series through both of said resistors.

3. An amplitude limiter for radio circuits comprising an input amplifying device of a type having an anode, cathode and control electrode, an output circuit for said device containing an antiresonant circuit in series with a first resistor, a first rectifier shunting the inductance of said antiresonant circuit and said first resistor, an output amplifying device of a pentode type having at least an anode, cathode and control electrode, a second resistor connecting the cathode of said output pentode device to the common junction of said antiresonant circuit and said first resistor, the series combination of a third resistor and a capacitor connected in shunt with the inductance of said antiresonant circuit, a connection between the junction of said third resistor and capacitor and the control electrode of said output pentode device, means to cause the anode current of said output device to flow in series through both of said first and second resistors, and means for impressing a voltage proportional to the drop through said output device and both of said first and second resistors on a load channel.

4. An amplitude limiter for radio circuits comprising first and second amplifying vacuum tubes, an anode, a cathode and a grid for each of said tubes, with said second tube comprising a pentode, a connection between the cathode of said first tube and ground, first and second serially-connected resistors connecting the cathode of said second pentode tube to ground, an electron path containing an antiresonant circuit and connecting the anode of said first tube to the junction of said first and second resistors, a first rectifier connected in shunt with said antiresonant circuit and said first resistor, a second rectifier connected in shunt with said antiresonant circuit and said second resistor, and an impedance element connecting a grid of said second pentode tube to the junction of said first and second resistors.

5. An amplitude limiter for radio circuits comprising first and second amplifying vacuum tubes, an anode, a cathode and a grid for each of said tubes, a connection between the cathode of said first tube and ground, with said second tube comprising a pentode having a substantially constant current characteristic, first and second serially-connected resistors connecting the cathode of said second tube to ground, an electron path containing an antiresonant circuit and connecting the anode of said first tube to the junction of said first and second resistors, a first rectifier connected in shunt with said antiresonant circuit and said first resistor, a second rectifier connected in shunt with said antiresonant circuit and said second resistor, and a connection between the junction of said first and second resistors and the grid of said second vacuum tube whereby the transconductance of said second pentode vacuum tube will be decreased when said first and second rectifiers begin to rectify.

References Cited in the file of this patent

UNITED STATES PATENTS

| | | |
|---|---|---|
| 2,144,995 | Pulvari-Pulvermacher | Jan. 24, 1939 |
| 2,329,558 | Scherbatskoy | Sept. 14, 1943 |
| 2,362,503 | Scott | Nov. 14, 1944 |
| 2,434,929 | Holland et al. | Jan. 27, 1948 |
| 2,497,693 | Shea | Feb. 14, 1950 |
| 2,604,592 | Levine | July 22, 1952 |

FOREIGN PATENTS

| | | |
|---|---|---|
| 137,715 | Australia | June 26, 1950 |
| 427,941 | Great Britain | May 2, 1935 |